Oct. 13, 1925.
H. S. WILSON
AUTOMATIC TOASTER
Filed July 14, 1922
1,557,513
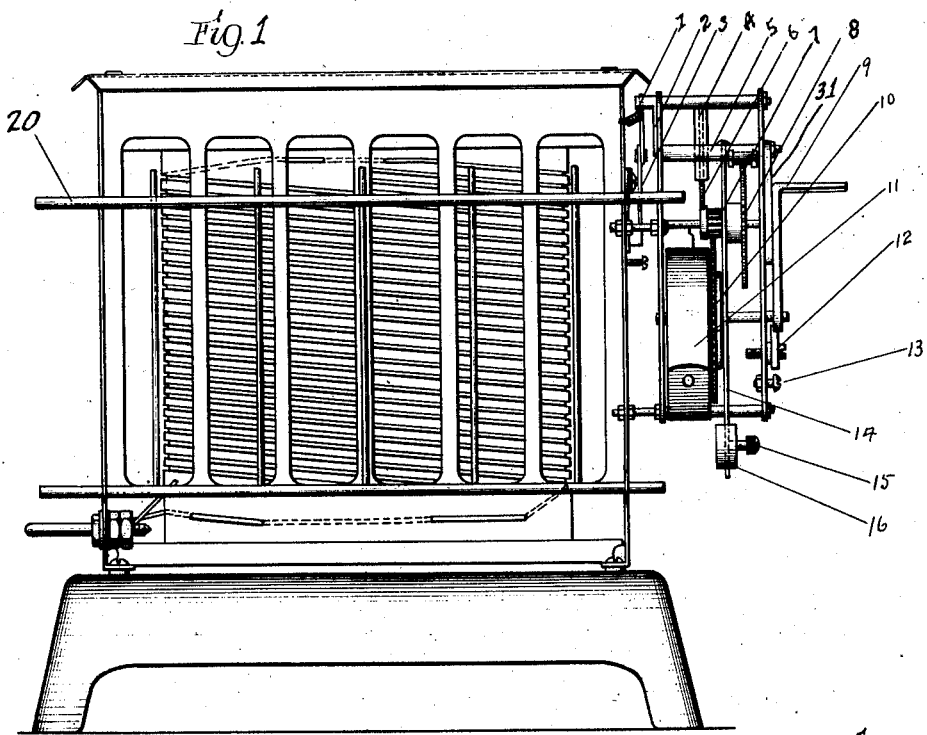
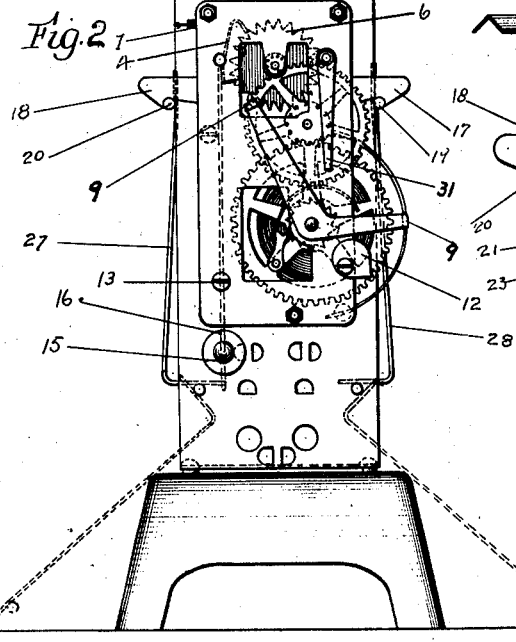
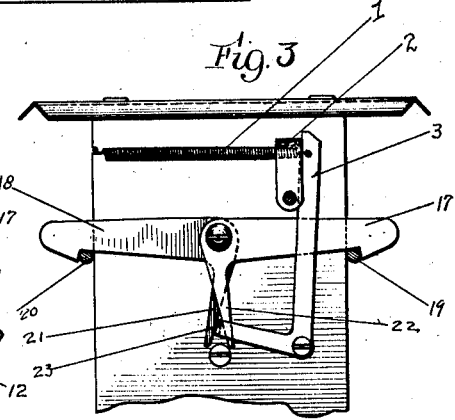
Inventor:
Herbert Sterling Wilson
Witness:
A. J. Sauser Patented Oct. 13, 1925.

1,557,513

UNITED STATES PATENT OFFICE.

HERBERT STERLING WILSON, OF CHICAGO, ILLINOIS.

AUTOMATIC TOASTER.

Application filed July 14, 1922. Serial No. 575,120.

*To all whom it may concern:*

Be it known that I, HERBERT STERLING WILSON, a citizen of the United States, residing at Chicago, in the county of Cook and State of Illinois, have invented new and useful Improvements in Automatic Toasters, of which the following is a specification.

My invention has relation to improvements in that class of inventions which have for their object, convenient methods for the toasting of various articles of food in which there are combined a source of heat, means to support or hold the article to be toasted and means to finally completely remove the toasted article.

In the toasting of most any article, the period of time between underdone and overdone, is very short, usually but a few seconds, thus making it necessary to give one's entire attention to the operation of the device, the failure of which causes unsatisfactory results and waste of food.

To obviate the necessity of personal attention and to provide means that will produce uniformly toasted articles, is the object of my invention and improvements, which, as I shall show and describe, may consist of a power-driven mechanism controlled by a timing device and so arranged that all the operations of toasting, timing, and withdrawing the finished article from the action of the heat and finally stopping the mechanism, are carried out.

In the construction of my invention or improvement, I do not limit myself to any source or method of producing heat, neither do I specifically prefer any special form or source of power for operating the motive features of my device. As to heat, it may be produced by an electrically heated element. The motive power may also consist of a wound spring, but in all cases my improvement or invention will have, in combination with a heating element, and power-driven mechanism, a timing device which will definitely fix the time of all the operations of toasting and removing the completed article.

In regard to the timing device, it may comprise a pendulum.

Realizing that there may be many variations of my device without in any way departing from the basic principles involved, and desiring to describe my device in such a manner as will enable anyone, skilled in the art, to readily understand its construction, I have provided certain drawings and descriptions thereof in which—

Fig. 1 is a side elevation of a complete toaster, showing the automatic feature as a spring motor attached at the right and controlled by an adjustable pendulum.

Fig. 2 is a view from the right of Fig. 1, and illustrates the complete device closed and ready to start.

Figure 3 is an enlarged view of a part of Figure 2 and is intended to show the holding and tripping devices, that do not appear fully in Figure 2.

Figs. 1, 2, and 3 illustrate the simplest form of my device, being composed of a spring motor, pendulum timing device, and latch-held toast holders, which are released after a definite period, allowing the holders to fall, after which the partly toasted article, such as bread, is turned by hand, and the operation repeated. Like parts throughout the various figures have the same numbers for convenience of examination and reference.

The construction of my device may be described as follows:—The motive power is the spring 11, which, through the gears, 10, 7, and 8, actuate the escape wheel 6, which, in turn, oscillates the verge 4, and through the medium of shaft 5, rod 14, and pendulum 16, form the timing mechanism which defines the periods or period of time of each operation. To vary the time, the pendulum weight 16, is held in place by the screw 15, thus permitting the weight 16 to be secured to the rod 14 in various positions, higher, if a shorter period is desired, and lower, if more time is required. The spring is wound by the lever 9, which is limited in action between the stops 12 and 13, stop 12 being provided with an adjustable eccentric whose object is to vary the amount of spring winding, and, in conjunction with the pendulum, lengthen or shorten the period of time that the device operates. Two hooks, 17 and 18, secure the holders 19 and 20 in position, when the toaster is in operative position, and are released by 23, passing between 21 and 22 as the spring unwinds, 23 being part of 3, which in turn is moved by 2, when the lever 9 comes in contact with 31 which is attached at the opposite end of shaft 5 from part 2.

To operate the device, the bread or article to be toasted is placed in the two holders 27 and 28, the winding lever 9, turned to the right, Fig. 2, and 27 and 28 closed, in which case the hooks 17 and 18 will grasp 19 and 20 and on release of the lever 9, the pendulum 16 will begin to oscillate, allowing the escapement 4 and 6, to permit the spring 11 to slowly unwind until such time as 23 will engage 21 and 22, raise the hooks 17 and 18, and cause the holders 27 and 28 to fall by gravity to the position indicated by the dotted lines 29 and 30. To toast the second side, the toast may be turned and the operation repeated.

I do not limit my device to the toasting of bread, as there are many articles that require a definite period of heating to produce satisfactory results the principal object of my invention being to automatically time and control the operations of toasting, baking, or otherwise cooking articles of food.

And now, having described my invention, its uses and various modifications, what I claim as new and useful and for which I desire to obtain Letters Patent of the United States is:—

1. An automatic toaster consisting of a heating element, means to support the article to be toasted at a suitable distance from the heating element, consisting of hinged frames, a spring actuated timing mechanism so arranged as to release the hinged frames and allow them to fall away from the heating element together with adjustable means to vary the time of exposure to the action of the heating element, all as has been described and specified.

2. A toaster consisting of a heating element, one or more hinged holders, means to lock the holders in position while the article is being toasted in combination with a spring actuated timing mechanism, provided with means to unlock or release the holders at the end of an adjustable period of time, all as has been described and specified.

HERBERT STERLING WILSON.